United States Patent [19]

Thompson et al.

[11] 4,342,988

[45] Aug. 3, 1982

[54] RUPTURE DISC ALARM SYSTEM

[75] Inventors: Leonard K. Thompson, Independence; William H. Corbett, Grain Valley, both of Mo.

[73] Assignee: Continental Disc Corporation, Riverside, Mo.

[21] Appl. No.: 115,261

[22] Filed: Jan. 25, 1980

[51] Int. Cl.³ .................. G08B 17/02; F16K 17/14; F16K 17/40
[52] U.S. Cl. .................. 340/679; 340/550; 340/590; 137/68 R; 137/554; 220/89 A; 200/61.08
[58] Field of Search ............... 340/679, 548, 550, 590, 340/591, 592, 595–598, 610, 626, 665, 668, 500, 501, 506, 532, 537; 137/67, 68 R, 554; 220/89 A; 200/61.08, 61.18, 61.23, 61.25, 61.86, 81 R, 83 R; 73/725, 726

[56] References Cited

U.S. PATENT DOCUMENTS

| 1,582,154 | 4/1926 | Zeiher et al. | 200/83 |
| 1,974,779 | 9/1934 | Lupold et al. | 340/550 |
| 3,109,553 | 11/1963 | Fike et al. | 340/550 |
| 3,441,925 | 4/1969 | White | 340/550 |
| 3,453,406 | 7/1969 | Pope | 340/550 |
| 3,665,312 | 5/1972 | Jarvis | 340/23 |
| 3,703,703 | 11/1972 | Payne | 340/521 |
| 3,770,918 | 11/1973 | Fortmann | 200/61.08 |
| 3,796,958 | 3/1974 | Johnston et al. | 340/539 |
| 4,012,728 | 3/1977 | Fowler | 340/539 |
| 4,162,449 | 7/1979 | Bouyssounouse et al. | 340/539 |
| 4,173,412 | 11/1979 | Ramsay et al. | 356/33 |
| 4,177,466 | 12/1979 | Reagan | 340/63 |
| 4,186,710 | 2/1980 | Kilgore | 340/64 |
| 4,187,496 | 2/1980 | Kovens et al. | 340/63 |
| 4,189,497 | 2/1980 | Howell et al. | 340/65 |

FOREIGN PATENT DOCUMENTS 1488798 10/1977 United Kingdom ............... 340/590

OTHER PUBLICATIONS

"Micro-Measurements", Catalog 95A, p. 6, 1975.

Primary Examiner—John W. Caldwell, Sr.
Assistant Examiner—Donnie L. Crosland
Attorney, Agent, or Firm—Fishburn, Gold and Litman

[57] ABSTRACT

A monitor system for sensing the failure of a rupture disc and activating an alarm in response to such a failure. The system also senses potential failure of a rupture disc. The system includes a failsafe signal carrying loop which is broken when the rupture disc fails, thereby interrupting the signal. The system also includes a signal sensor which recognizes a signal interruption or substantial modification in the signal and initiates and cooperates with an alarm device to provide notice to an operator or a safety device that the rupture disc has failed.

15 Claims, 12 Drawing Figures

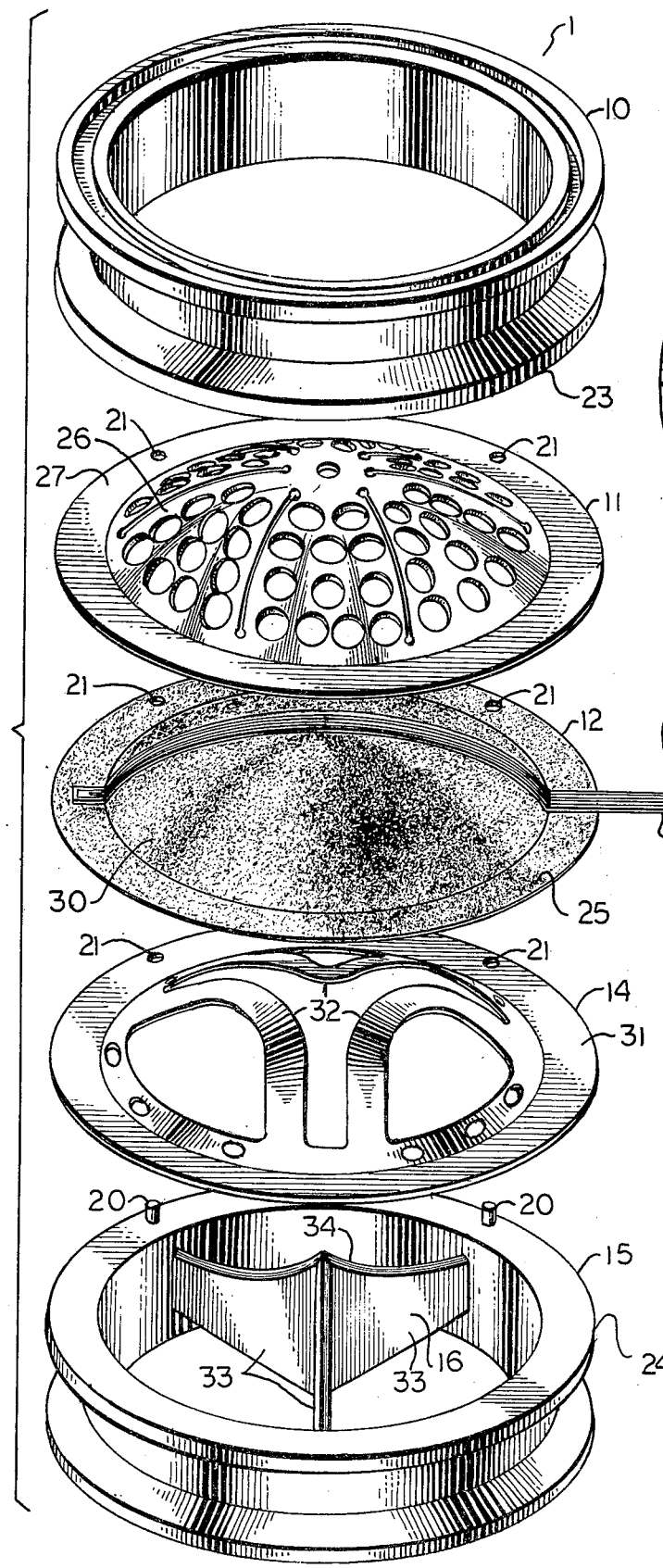
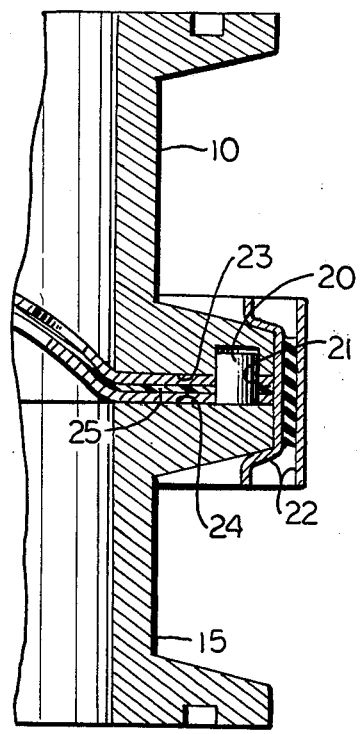

RUPTURE DISC ALARM SYSTEM

BACKGROUND OF THE INVENTION

The present invention relates to a failsafe monitoring system for detecting actual or impending failure of a rupture disc and providing an alarm when such a failure occurs.

The most frequent utilization of a rupture disc is in pipelines which are normally unused vent passageways in a chemical process system but which are intended to provide safety relief should some process vessel or conduit over or under pressurize, thereby creating a hazardous condition. The rupture disc, by its nature, is usually hidden from view and, therefore, it is often difficult to visually determine when failure thereof has occurred. Even when it is obvious to an observer that failure of a rupture disc has occurred, such as when a gas or liquid fluid is suddenly venting or flowing into an open area where none should be, it is still important that the failure be noticed as quickly as possible, since the fluid may be hazardous and/or explosive, and since some type of safety equipment or procedure may be immediately required to protect personnel and/or equipment. For example, it may be necessary to shut off a pump to stop the discharge.

Conventional rupture disc alarm systems typically require that a portion of a broken disc engage a sensing probe or similar device before an alarm is sounded. A disc failure, however, can be sufficiently explosive or unpredictable in operation to leave no parts in position for engaging the probe or the probe itself can be rendered inoperative due to damage or electrical failure. Also, the probe systems typically do not detect potential failure of a disc, such as the stretching thereof to a predetermined percentage of the failure point. Further, conventional systems normally detect failure of a disc in only one direction, thus requiring multiple systems. Still further, probe systems are usually difficult to install and require special mounting parts and procedures. In addition, conventional alarm systems are often not failsafe, whereby they do not sound an alarm in case of part failure or loss of power.

It is noted that pressure switches have been utilized to sense failure of a rupture disc; however, such switches can only be used in closed systems wherein pressure will build downstream of a broken rupture disc and thus activate the switch, especially if the escaping fluid has a low pressure differential across the disc and slow flow rates. It is therefore desirous to have a failure sensing device which will function in open as well as closed systems and particularly in low pressures.

It is also noted that rupture discs are often used in areas wherein there is a potential for explosion. Therefore parts of a rupture disc in the explosive area should be intrinsically safe electrically and otherwise explosion proof.

OBJECTS OF THE INVENTION

Therefore, the objects of the present invention are: to provide a monitoring system for detecting failure in a rupture disc and notifying operating personnel or modifying operating equipment in response to such a failure; to provide such a system for also detecting impending or partial failures of rupture discs; to provide such a system which can detect failure in two directions; to provide such a system which is failsafe in design; to provide such a system comprising a signal carrying circuitor loop which is interrupted or otherwise modified by failure or impending failure of the rupture disc and a signal sensor which detects such a modification of the signal passing through the loop and activates an alarm; to provide such a system wherein failure of any portion thereof interrupts the signal and activates the alarm and is, therefore, essentially failsafe; to provide such a system wherein the loop may include an intrinsically safe electrical signal passing therethrough; to provide such a system which will function in both closed and open systems, at low pressures; to provide such a system which is relatively easy to install in conjunction with a rupture disc; to provide such a system having a signal carrying loop which is easily and simply replaced along with an associated rupture disc after failure of the latter; to provide such a system which is economical to produce, positive in operation, easy to use, and particularly well adapted for the proposed usage thereof.

Other objects and advantages of this invention will become apparent from the following description taken in connection with the accompanying drawings wherein are set forth by way of illustration and example, certain embodiments of this invention.

SUMMARY OF THE INVENTION

A monitoring system is provide for detecting total, partial and/or impending failure of a rupture disc which blocks passage of fluids through a conduit and activates an alarm when such a failure occurs. The system comprises a signal carrying circuit or loop, a signal sensor and an alarm mechanism. The signal carrying loop is part of, adjacent to or in close association with the rupture disc to be monitored, such that a modification of the disc also creates a signal modifying change in the signal carrying loop. In one embodiment of the invention the signal is an electrical current; the signal carrying loop is an electrical circuit which varies in resistance if broken or otherwise modified; and the signal sensor is a device to sense change in the electrical signal caused by variance of the resistance in the circuit. In another embodiment of the invention, the signal is an optical wave or light generated by a suitable source, the signal carrying loop is a light transmitting optical fiber, and the sensor includes means such as a photocell which is responsive to changes in light intensity or level. The signal sensor may be adjusted to detect actual failure and/or stretching of the rupture disc to a predetermined percentage of failure. The alarm mechanism may notify operating personnel, activate safety equipment, and/or modify process equipment when failure or impending failure of a rupture disc is detected.

The drawings constitute a part of this specification and include exemplary embodiments of the present invention and illustrate various objects and features thereof.

BRIEF DESCRIPTION OF THE DRAWINGS

FIG. 4 is an exploded perspective view of a portion of the relief assembly.

FIG. 5 is a fragmentary cross-sectional view of the relief assembly taken along line 5—5 of FIG. 3.

FIG. 6 is a perspective view of a rupture disc and signal carrying loop for the rupture disc assembly.

FIG. 7 is a fragmentary cross-sectional view of the rupture disc and signal carrying loop as shown.

FIG. 8 is a perspective view of a modified rupture disc and signal carrying loop.

FIG. 9 is a cross-sectional view of a second modified rupture disc incorporating a signal carrying loop.

Figure 1:
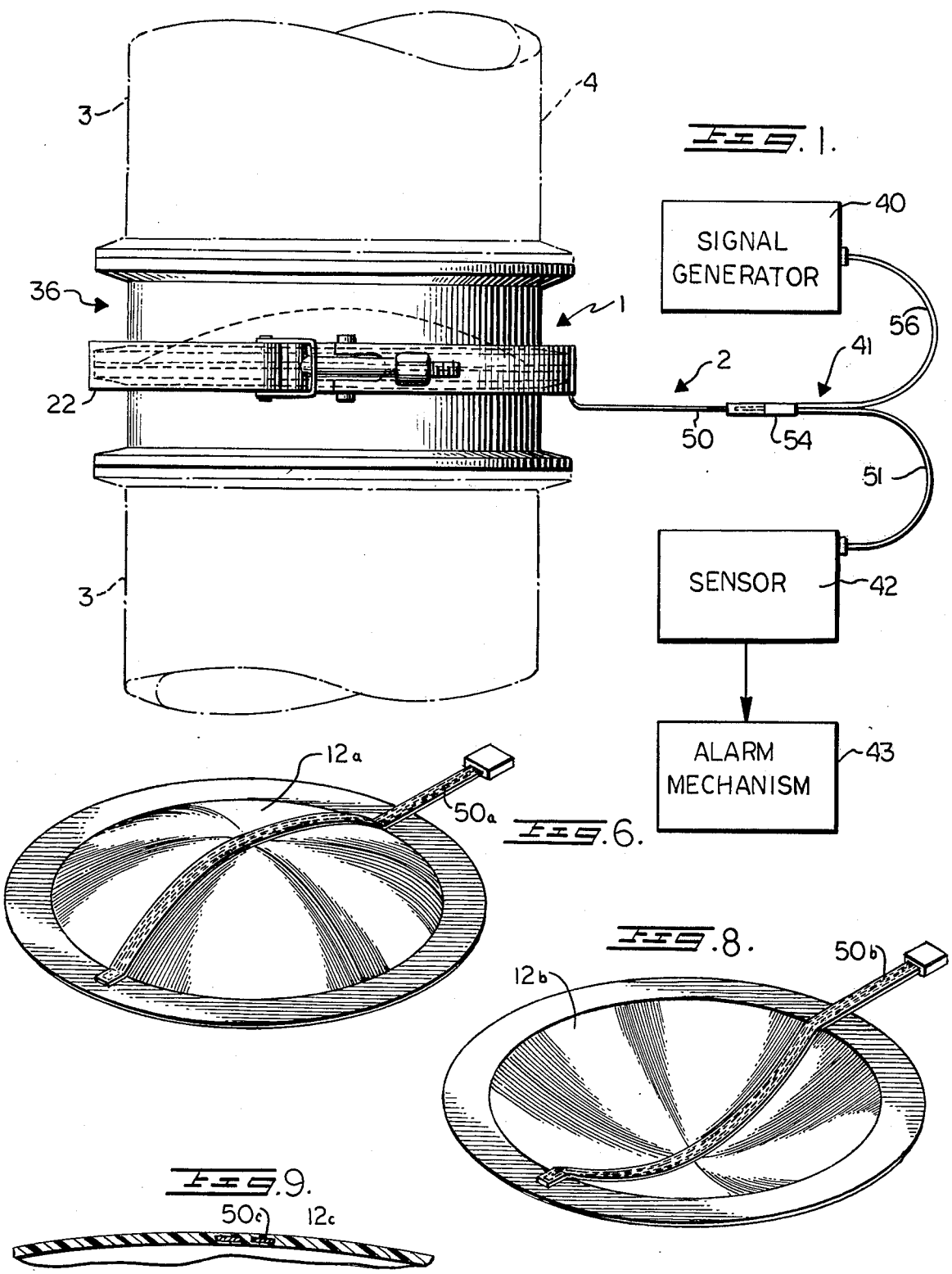
FIG. 1 is a partially schematic side elevational view of a rupture disc relief assembly incorporating a disc failure monitoring system according to the present invention.

Material thickness in the drawings may in some places be exaggerated for illustrative purposes.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
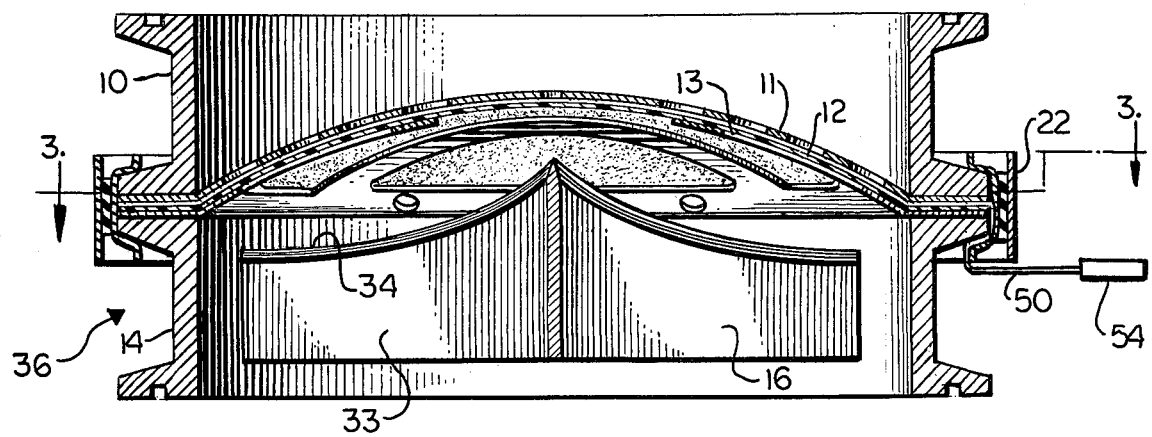
FIG. 2 is an enlarged vertical cross-sectional view of the relief assembly as shown in FIG. 1.
Figure 3:
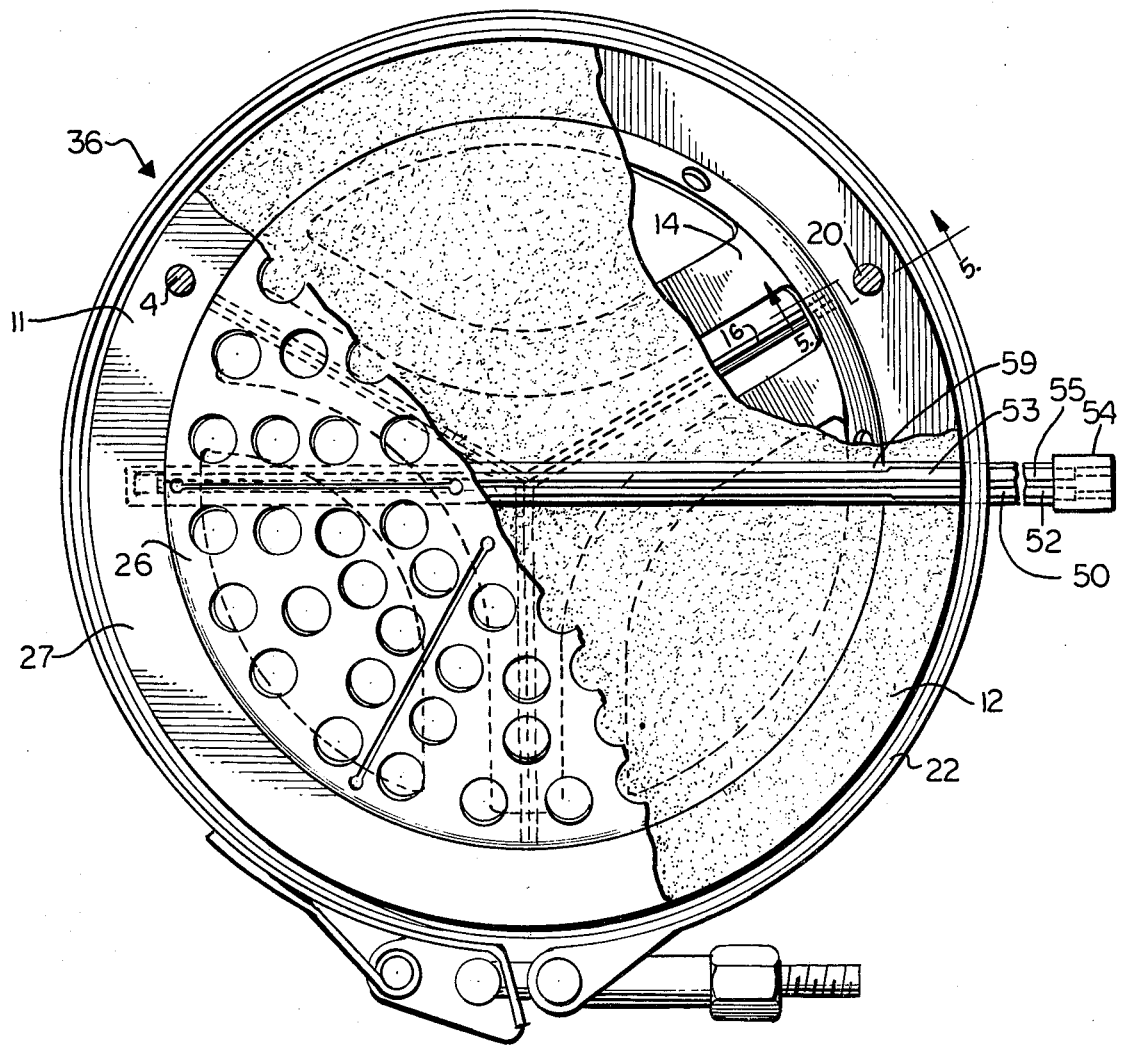
FIG. 3 is a transverse cross-sectional view of the relief assembly taken along line 3—3 of FIG. 2 with portions broken away to show detail thereof.

For purposes of description herein in the terms "upper," "lower," "vertical," "horizontal," and derivatives thereof along with other directional references shall relate to the invention as oriented in FIGS. 1 through 3; however, it is to be understood that the invention may assume various alternative orientations, except where expressively specified to the contrary.

The reference numeral 1, as shown in FIG. 1, generally designates a rupture disc assembly including a rupture disc failure monitoring system 2, according to the present invention, positioned between two spaced portions 3 of a conduit such as the illustrated vent pipe 4 or the like. In normal operation the assembly 1 is secured to the vent pipe portions 3 by suitable means such as bolted flanges, welding, treaded engagement, clamps or the like, such that the assembly 1 is secured in place and fluid is prevented from seepage between the interconnection thereof with the vent pipe portions 3. As used herein the term "fluid" means both gases and liquids.

The assembly 1, normally blocks flow of fluids in either direction along the vent pipe 4. The vent pipe 4 generally communicates with processing equipment such as positive and negative pressure vessels (not shown) and provides relief for excessive pressure conditions therein. In order to relieve from one vent portion 3 to the other, the blockage provided by the assembly 1 is ruptured or otherwise removed.

The assembly 1, as is partially shown in FIG. 4, comprises an outlet crown 10, a perforated top section 11, a deformable member, disc, or rupturable seal 12 having a portion of the monitoring system 2 attached thereto, a lower vacuum girdle 14, and an inlet crown 15 having a knife blade assembly 16 mounted therein. Pins 20 pass through apertures 21 in and secure against horizontal rotary movement of the top section 11, the seal 12 and the girdle 14 relative to the crowns 10 and 15. A quick disconnect sanitary type band 22 extends around and secures together proximate circumferential flanges or edges 23 and 24 of the crowns 10 and 15 respectively, see FIG. 1, with an outer annular flange portion 25 of the seal 12 secured therebetween. It is foreseen that the assembly 1 could vary greatly within the conventional art of rupture disc protection devices requiring only a rupturable type seal which is deformed and/or broken by excessive positive and/or negative pressure and which functions in cooperation with the monitoring system 2.

In the particular assembly 1 illustrated in FIG. 4, the top section 11 is a forward type rupturing disc having a perforated and radially grooved, cut or slit concave-convex portion 26 and a relatively flat annular flange portion 27. The section 11 is similar to that type shown in U.S. Pat. No. 3,881,629.

The seal 12 illustrated in FIG. 4 is constructed of a material suitably impermeable to whatever fluid will be blocked thereby. A suitable material may be a flexible plastic such as tetrafluoroethylene and co-polymers, such as are marketed under the trademark "Teflon". The seal material and thickness thereof is selected so as to be frangible or stretchable to such a degree that rupture occurs when a preselected positive or negative pressure differential is reached on opposite sides thereof. In some rupture disc assemblies, a seal will not be externally supported. However, in FIG. 4 both the section 11 and the girdle 14 support the seal 12 against certain positive and negative pressure differentials respectively. The seal 12 should also be able to withstand slight but rather continuous flexing which occurs due to frequently changing pressure differentials without fatigue failure. Although the seal may take many various shapes or forms including flat, the illustrated seal 12 has a concave-convex interior portion 30 to which the flange 25 is secured. Frequently, a convex side of the seal 12 substantially mates with a concave side of the section 11; however, in some prewarning installations, it is desired to determine when a pressure differential between opposite sides of the seal 12 has reached a certain percentage of that differential which will cause rupture of the seal 12. In such prewarning installations, the seal 12 may be spaced from or have a somewhat different curvature as compared to the section 11. It is foreseen that the seal 12 could be a wide variety of non-metallic or metallic materials such as aluminum. The girdle 14 may be any suitable support structure preventing the seal from buckling or reversing until a preselected negative pressure differential is reached. The illustrated girdle 14 has an outer annular flange 31 and three stays 32. The stays project upwardly and inwardly so as to mate with the convex side of the seal 12. The top section flange 27, the seal flange 25, and the girdle flange 31 are preferably coextensive with each other and with the proximate crown flanges 23 and 24 such that a seal is formed therebetween to prevent seepage of fluid from the interior to the exterior of the assembly 1. Suitable gaskets or gasketing sealant may be utilized where necessary to produce such a fluid seal.

The cutting member or knife blade 16 has three radiating arms 33 extending upwardly near an axis thereof and joining with the inlet crown 15. The upper end of each arm 33 is sharpened so as to form a cutting edge 34. The knife blade 16 is aligned with the girdle 14 such that the girdle stays 32 do not engage the cutting edge 34 if the stays 32 are deformed toward the inlet crown 15.

The cutting edge 34 is aligned so as to engage, impale, and rupture the seal 12 should the latter be deformed in such a manner to invert or buckle, that is, wherein the normal concave side of the seal 12 would become a convex side and vice versa.

In the illustrated embodiment the crowns 10 and 15, the section 11, the girdle 14, the band 22 and parts associated therewith function as support means 36 for the seal until the latter is ruptured. It is seen that the seal support means 36 could be very complex or very simple depending on the type of assembly utilized. It is also seen that the seal could function as part of the support means 36 for example by combining the girdle 14 and seal 12 illustrated into a single unit.

The monitoring system 2 comprises generating means 40, signal carrying means 41, sensor means 42 and alarm means 43.

Figure 10:
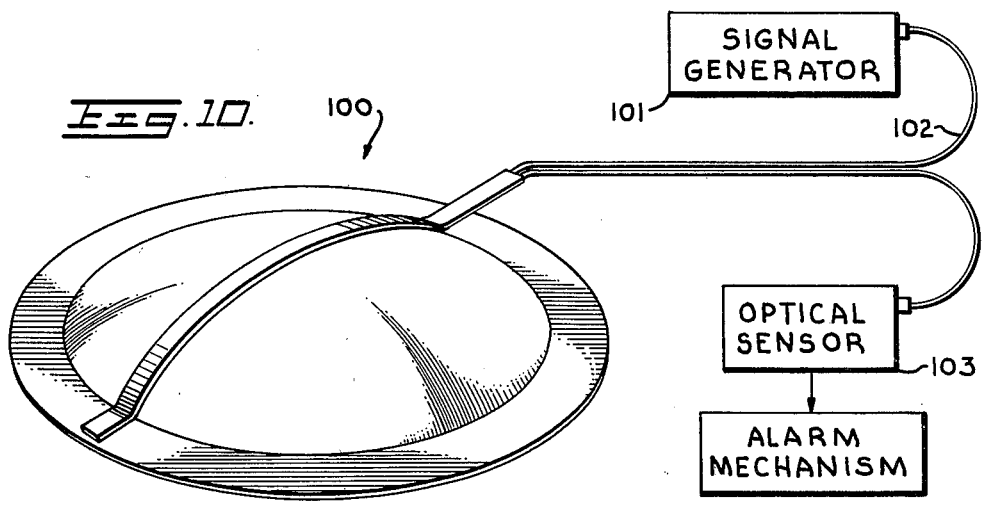
FIG. 10 is a perspective view of a third modified disc incorporating a signal carrying loop.
Figure 11:
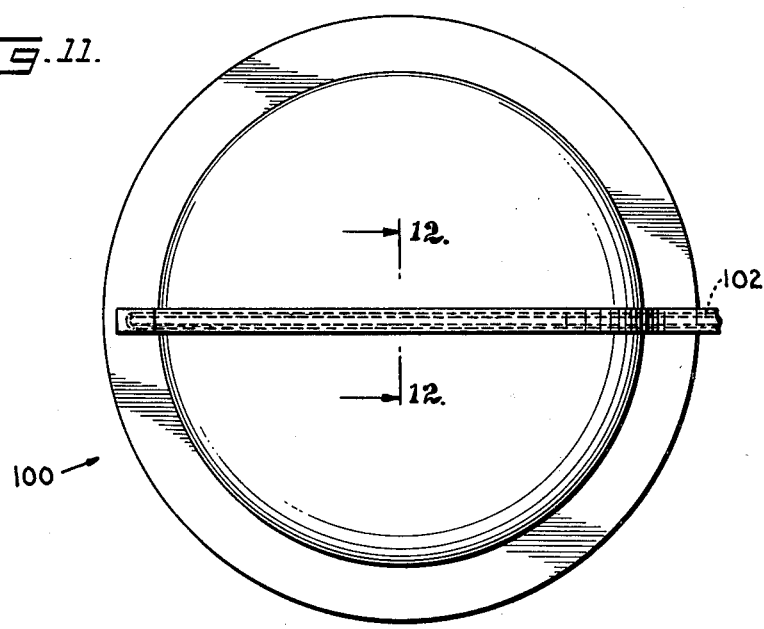
FIG. 11 is a top plan view of the third modified disc.
Figure 12:
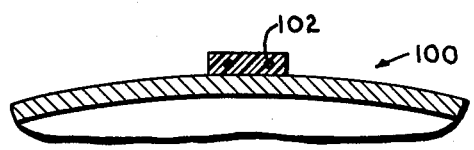
FIG. 12 is a fragmentary and enlarged cross-sectional view of the third modified disc taken along line 12—12 of FIG. 11.

The generating means 40 may be any suitable device for producing a signal and is shown in FIG. 1 by the box denoted "signal generator". Preferably the generating means 40 produces a "pulsating" or continuous signal, although it is forseen that any definable varying signal could be utilized provided that proper cooperation with the sensor means 42 is provided such that an undefined variance in the signal could be detected as will be described below. The generating means 40 may produce an electrical, optical, fluid flow, or other suitable signal depending on the particular system utilized. The illustrated generating means 40 produces an electrical current having a predetermined reference energy level. Supply of such an electrical current may be accomplished by utilizing a conventional public power supply from an A.C. electrical line, producing an electrical current with a generator or battery, or transforming one of the previously mentioned supplies into a suitable signal. As many installations require an intrinsically safe, that is a sufficiently low voltage and amperage electrical system to avoid possible fires or explosions, it is preferable that the electrical current and voltage be sufficiently low to avoid such dangerous energy levels capable of igniting explosive atmospheres. Transformation of standard A.C. electrical supply to produce an electrical current within the nature of 6 volts D.C. and less than 0.1 M amperes has been found to generate a suitably failsafe signal when coupled with proper resistence throughout the system 2. It is noted that where no electricity can be tolerated within the system, the optical signal may be utilized. The generating means for an optical system 100, such as is shown in FIGS. 10 through 12, comprises a light or optical wave producing mechanism 101 such as a bulb, light emitting diode or laser and an associated optical fiber 102 to transmit the light.

The said carrying means 41, as illustrated in FIGS. 1 through 5, comprises a circuit, conduit, or loop 50 which transmits a signal from the generating means 40 to the sensor means 42. The loop 50 passes in close proximity to the seal 12 and is preferably secured thereto or equivalently to another deformable member of the assembly 1. The loop 50 has the capacity to be altered when an associated seal 12 is deformed, such as when the seal 12 is ruptured, although in some installations the loop 50 is altered or modified when the seal 12 is simply flexed or stretched without rupturing. Preferably alteration of the loop 50 produces a proportional modification in the level of energy of the signal transmitted thereby as compared to the reference level of energy produced by the generating means 40.

In the illustrated embodiment the loop 50 includes a shielded cable or conduit comprising a first wire 56 from the signal device or generating means 40 which joins with one end 52 of a U-shaped wire 53, as best seen in FIG. 3, at a quick type terminal or connector 54. An opposite end 55 of the U-shaped wire 53 joins at the connector with a second wire 51 which is electrically connected to the sensor means 42. In this manner an electrical circuit from the generating means 40 to the sensor means 41 is completed, provided the U-shaped wire 53 remains intact.

Preferably the U-shaped wire 53 has a resistance which varies in inverse proportion to the cross-section thereof. Hence, as the seal 12 deforms, the wire 53 is stretched causing the latter to also deform and, in particular, to change in cross-section. Such a change in cross-section increases the resistance of the wire which in turn modifies or alters the signal being transmitted by the loop 50. Of course, if the seal 12 ruptures, the loop 50 is broken, thereby modifying the transmitted signal and, in particular, completely interrupting the signal. The loop 50 may be broken by overstretching under tensile forces or by being cut by the cutting edge 34.

The loop 50, as shown, comprises a thin conductor or U-shaped wire 53 of an electrically conducting metal or other suitable conducting material, such as gold, copper, graphite, or the like. A metal wire or foil may be deposited directly on a non-conducting seal 12 by metal plating, sputtering, vacuum deposition, silk screening, or the like. Preferably, the conductor 53 is insulated from the remainder of the assembly 1 by a suitable insulator 59, such as a polyester base film or the like. In the Figures, the insulator 59 is clear so that integrity of the loop 50 can be visually checked. Also, preferably, the loop 50 and insulator 59 therefor are attached to the seal 12 by direct application or suitable adhesive (not shown), such as a silicone adhesive or the like or the loop may be a conductive adhesive. The loop 50 may be reinforced by tape, conduit or the like between the emergence thereof from the support means 36 and the connector 54.

It is noted that the illustrated loop 50 is fully insulated within the vicinity of the assembly 1 while electricity is passing through or being transmitted by the loop 50. In addition, the loop 50 does not require special pipe or other parts requiring machinery to pass from the interior to the exterior of the support means 36. Also, the system is designed for inherent intrinsic safety.

As is illustrated, the loop 50 may be positioned on the convex side of the plastic seal 12. As seen in FIGS. 6 & 7, a loop 50a may be positioned on the convex side of a metallic seal 12a. The actual material of construction of a particular seal may vary substantially within the present invention. Alternatively, as seen in FIG. 8, a loop 50b may be positioned on the concave side of a seal 12b. Further alternatively a loop 50C may be positioned within and thus be made part of a seal 12c as shown in FIG. 9. It is foreseen that many possible placements of a suitable loop 50 are possible which are not illustrated herein; in particular, placement on the section 11 or girdle 14. Also, multiple use of different loops is possible, such as where it is desirious to continuously measure maximum deformation which the disc has experienced in either possible direction.

The sensor means or signal sensor 42 cooperates with the generating means 40 and, in particular, with the signal carrying means 41 and thereby detects the signal transmitted by the latter. The sensor 42 is adapted to detect variations, alterations or modifications in the energy level of the transmitted signal. In particular, the sensor means 42 has the capacity to respond to a modification of a predetermined amount of a transmitted signal and provide notice to or trigger an alarm or response at a location remote from the seal 12 when the signal has been modified. The major modification to the signal detected by the sensor 42 occurs when the seal 12 is ruptured, thus breaking the loop 50 and modifying the signal by stopping same completely. However, it is not necessary that the loop 50 break for the sensor 12 to provide the notice; in particular, the sensor 42 could be set, programmed or the like to provide notice when a seal expands, stretches or otherwise deforms to indicate that a certain percentage of the differential pressure which would cause rupture of the seal 12 has occurred or that fatigue has occured in the seal 12 and it should be replaced. Multiple loops 50 each on a respective seal 12 with associated sensors 42 set to give notice at different differential pressures or a sensor 42 programmed to give notice at multiple differential pressures can be utilized to continuously monitor a seal 12 before failure thereof without replacement of the seal 12 or loop 50.

The sensor 42 for an electrical signal may be any suitable device for receiving an electrical signal, detecting a change in the signal, and providing a response to the change. Normally the sensor 42 would be displaced from the seal 12. For optical signals associated with the optical system 100 of FIGS. 10 through 12, the sensor means comprises an optical sensor 103 for sensing the energy of an optical signal, detecting a predetermined change in the energy level, and providing notice of or response to such a change. Such an optical sensor 103 could include a photocell or a phototransistor cooperating with appropriate circuitry.

The alarm means or alarm mechanism 43, as illustrated by the box labelled "alarm mechanism" in FIG. 1, cooperates with the sensor 42 such that an alarm is triggered or activated by the notice or response which is provided by the sensor 42, that is, the notice or response that the seal 12 has deformed an amount for which it has been predetermined that something or someone should be notified.

The alarm means 43 may be any suitable device such as a horn, buzzer, flashing light or the like. In addition the alarm means 43 may simply constitute a transmission of a secondary signal such as the notice provided by the sensor means 42. Such a secondary signal can be utilized to activate safety equipment, initiate a change in operating equipment such as stopping a pump, or the like.

Preferably the alarm means 43 is activated by failure of the various components of the system 2 and, in particular, by failure of the generating means 40, the carrying means 41 or the sensor means 42. This may be accomplished by having the same power supply which operates the various components of the system 2 cooperate with the alarm means 43, such that when power is on the alarm means 43 is activated only by the sensor means 42 but when power fails to the entire system 2 or to one of the components thereof, then the alarm means 43 is also activated thereby making the system 2 failsafe, in that failure of any of the components of the system 2 activates a warning alarm thus preventing an undetected failure of the seal 12 when the system 2 is not functional.

The above described system 2 may be utilized: with standard rupture discs, reverse buckling discs, or graphite discs; as a component part in composite discs or double acting discs; as a leak detector, provided the leak modifies the seal; as a pressure detector in a pipeline; to detect fatigue or overpressure of a disc thereby predicting failure before same occurs; or the like.

In operation, the system 2 is installed, as shown in the figures for example, in conjunction with a seal 12 and support means 36 therefor in a vent pipe 4 or the like, thereby forming a complete assembly 1 for blocking flow of fluid through the pipe 4 until an excessive differential pressure occurs on opposite sides of the seal 12 at which time the disc or seal 12 fails or ruptures allowing flow of the fluid through the pipe 4. The system 2 detects rupture of the seal 12; in particular, a signal is produced by the generating means 40 and transmitted by the carrying means 41 to the sensing means 42 before failure. The carrying means 41 is broken when the seal 12 breaks, thus stopping transmission of the signal. The sensor means 42 detects that the signal has stopped and activates the alarm means 43.

For detection of an impending failure of a seal 12, the above process is the same except that the seal 12 deforms but does not deform sufficiently to break. The loop 50 deforms with the seal 12 and thus alters or modifies the signal. The sensor means 42 detects that the signal has been modified and when the modification of the signal drops to a predetermined level or amount, the sensor means 42 activates the alarm means 43.

Therefore, the method or process for detecting failure of the seal 12 of the assembly 1 comprises: generating a detectable signal, passing the signal through carrying means 41 closely associated with the seal 12 which carrying means 41 is modifiable by changes in condition of the seal 12, monitoring the signal after passing the seal 12, determining when a significant change has occurred in the signal after passing the seal 12, and relaying an alarm to a location remote from the seal 12 when such a significant change in the signal has occured.

It is to be understood that while certain embodiments of the present invention have been described and shown herein, it is not to be limited to specific forms or arrangement of parts herein described and shown, except insofar as such limitations are included in the following claims.

Having thus described the invention, what is claimed and desired to secure by Letters Patent is:

1. A monitoring system for detecting alterations in a deformable member of a rupture disc assembly; said system comprising:
   (a) generating means for producing a signal;
   (b) signal carrying means in touching relationship and positioned on said deformable member and transmitting said signal therethrough when said member is not deformed; said carrying means having a modifiable transmission capacity and being sensitive to alterations in said deformable member such that the carrying means transmitted signal is modified when alterations occur in said deformable member;
   (c) sensor means cooperating with said generating means and said carrying means for detecting said transmitted signal; said sensor means having the capacity to determine when said transmitted signal has been modified a predetermined amount and triggering a response at a location remote from said deformable member indicating that said signal has been modified said predetermined amount; and
   (d) alarm means remote from said deformable member and being triggered by said sensor means upon said transmitted signal being modified said predetermined amount;

(e) whereby said alarm means is activated whenever said deformable member is altered a sufficient amount to modify said transmitted signal said predetermined amount.

2. The system according to claim 1 wherein:
(a) said signal is electrical; and
(b) said signal carrying means comprises an electrical circuit.

3. The system according to claim 1 wherein:
(a) said signal is a light beam; and
(b) said signal carrying means comprises a light transmitting optical fiber.

4. The system according to claim 1, 2 or 3 wherein:
(a) said deformable member is rupture disc seal; and
(b) said carrying means is physically attached to said seal in such a manner that when said seal ruptures, then said carrying means is broken thereby interrupting and thus modifying said transmitted signal.

5. The system according to claim 4 wherein:
(a) said seal deforms by stretching before rupture thereof; and
(b) said carrying means deforms with said seal and has the capacity to modify the signal transmitted thereby in substantive proportion to the stretching of said seal;
(c) whereby when said seal is stretched a prespecified amount then said signal is modified said predetermined amount such that said alarm means is activated.

6. The system according to claim 5 wherein:
(a) said carrying means comprises an electrical current carrying wire being attached to said seal to stretch therewith and having a varying resistance related to the cross-sectional area thereof; the cross-sectional area of said wiring varying in proportion to the stretching of said seal.

7. The system according to claim 3 wherein:
(a) said alarm is activated whenever said signal is modified by means external to said system; and
(b) said alarm is activated whenever said sensor fails to function; whereby said system is failsafe.

8. A rupture disc assembly for relief of excessive fluid pressure in at least one direction in processing equipment and for triggering an alarm located remotely from said assembly when such relief occurs; said assembly comprising:
(a) a rupturable seal positioned to operably block flow of fluid through a conduit communicating with the processing equipment during normal operating conditions; said seal rupturing and allowing flow of fluid during conditions of excessive fluid pressure in the processing equipment;
(b) support means securing said seal prior to rupture thereof in said conduit;
(c) generating means developing a signal comprising a reference level of energy;
(d) carrying means cooperating with said generating means to transmit said signal; said carrying means being positioned in touching relationship with respect to and extending along said seal and being physically altered by a change in condition in said seal thereby modifying said signal;
(e) sensor means cooperating with said generating means and said carrying means and monitoring said signal after transmission by said carrying means, said sensor means detecting a change in the transmitted signal and producing a response to such a change; and
(f) alarm means remote from said seal and cooperating with said sensor means and being activated by said response after a predetermined level of change in the transmitted signal;
(g) whereby when the condition of said seal changes a sufficient amount to produce said predetermined level of change in the transmitted signal, said alarm is activated.

9. The assembly according to claim 8 wherein:
(a) said generating means comprises an electrical power supply;
(b) said signal is electrical; and
(c) said carrying means comprises an electrical circuit.

10. The assembly according to claim 9 wherein:
(a) said seal is stretchable to a predetermined limit before rupturing;
(b) a portion of said circuit is attached to said seal such that said circuit is stretched whenever said seal is stretched; and
(c) said circuit modifies the signal being transmitted thereby upon stretching.

11. The assembly according to claim 10 wherein:
(a) stretching of said circuit decreases the cross section thereof, thereby changing the electrical resistance thereof.

12. The assembly according to claim 9 wherein:
(a) said electrical circuit includes an electrical supply being in the nature of not more than approximately 6 volts D.C. and not more than approximately 0.1 M amperes; whereby
(b) said electrical circuit is generally intrinsically safe for use in conjunction with explosive fluids in said conduit.

13. The assembly according to claim 8 wherein:
(a) said sensor means produces a continuous impulse upon reception of the signal transmitted by said carrying means unless said predetermined level of change has occurred in said transmitted signal and sends said impulse to said alarm means; said impulse being stopped by mechanical and electrical failures of said sensor means; said alarm means being maintained is a non-activated state when receiving said impulse and being in an activated state when not receiving said impulse; whereby said alarm means is activated when said sensor means fails and when said signal is modified said predetermined level of change, such that said system is substantially failsafe.

14. In combination:
(a) a rupture disc seal having opposed sides for blocking flow of fluid through a passageway until a differential pressure between said sides exceeds a predetermined level whereupon said seal ruptures; and
(b) a conduit having a pathway adapted for transmitting a signal from one end thereof to an opposite end thereof; said conduit being fixedly attached to said seal such that said pathway is broken and incapable of transmitting a signal when said seal ruptures; said conduit also being adapted to communicate with alarm means such that when said pathway is unbroken said signal is transmitted to said alarm means and when said pathway is broken said signal is not transmitted to said alarm means thereby activating said alarm means.

15. The combination according to claim 14 including:
(a) generating means for producing a signal and delivering said signal to said conduit one end;
(b) sensor means for receiving a transmitted signal from said conduit opposite end, sensing an interruption of said signal, and producing a response to such an interruption; and
(c) alarm means being triggered by said response.

* * * * *